United States Patent [19]

Zimmer

[11] 4,184,976

[45] Jan. 22, 1980

[54] METHOD OF MAKING METALLIC OXIDE OR CARBIDE PARTICLES

[75] Inventor: Erich Zimmer, Julich, Fed. Rep. of Germany

[73] Assignee: Kernforschungsanlage Julich Gesellschaft mit beschrankter Haftung, Julich, Fed. Rep. of Germany

[21] Appl. No.: 854,008

[22] Filed: Nov. 22, 1977

Related U.S. Application Data

[63] Continuation-in-part of Ser. No. 681,749, Apr. 29, 1976, abandoned, which is a continuation of Ser. No. 467,729, May 7, 1974, abandoned.

[30] Foreign Application Priority Data

May 8, 1973 [DE] Fed. Rep. of Germany ....... 2323072

[51] Int. Cl.$^2$ ..................... C01G 43/02; C04B 35/00
[52] U.S. Cl. ............................. 252/301.1 S; 264/0.5; 423/260
[58] Field of Search ................. 252/301.1 S; 264/0.5; 423/260

[56] References Cited

U.S. PATENT DOCUMENTS

| | | | |
|---|---|---|---|
| 3,453,216 | 7/1969 | Fitch et al. | 252/301.1 S |
| 3,629,138 | 12/1971 | Thomas | 252/301.1 S |
| 3,812,049 | 5/1974 | Noothout et al. | 252/301.1 S |
| 3,888,787 | 6/1975 | Hein et al. | 252/301.1 S |

*Primary Examiner*—Benjamin R. Padgett
*Assistant Examiner*—Deborah L. Kyle
*Attorney, Agent, or Firm*—Becker & Becker, Inc.

[57] ABSTRACT

A method of making metallic oxide or carbide particles of uranium, which comprises fuels or breeder materials for nuclear reactors. An aqueous solution of uranyl nitrate or chloride and, if necessary, colloidal carbon is added dropwise into an organic ketone or ketone mixture phase which is located above an aqueous ammonia solution. The thereupon formed particles are sintered.

9 Claims, No Drawings

METHOD OF MAKING METALLIC OXIDE OR CARBIDE PARTICLES

This is a continuation-in-part of co-pending application Ser. No. 681,749—Zimmer filed Apr. 29, 1976 (now abandoned) as a straight continuation of Ser. No. 467,729—Zimmer filed May 7, 1974 (now abandoned).

The present invention relates to a method of making metallic oxide or metallic carbide particles comprising fuels and/or breeder materials for nuclear reactors, such as oxides or carbides of uranium. According to this method, an aqueous solution of uranyl nitrate or chloride and if necessary, also containing carbon in colloidal form, is added dropwise into an organic phase which is above an aqueous ammonia solution and which comprises a ketone or ketone mixture. The thus formed, if necessary carbon containing oxide particles are sintered.

Various methods are known for making such spherical metallic oxide or carbide particles. For instance, it is known to make spherical fuels or breeder materials by adding drops of a metallic salt solution or a sol to a hot organic solvent, such as paraffin oil, which is only slightly miscible with water. These drops are solidified by dehydration by means of the solvent or by a chemical reaction. This is accomplished in a known manner by raising the pH of the dropped in solution with the help of ammonia yielding substances. With this known method the spherical shape of the particles is formed by means of the surface forces between the organic solvent and the aqueous drops of the sol. International Atomic Energy Agenca, Vienna, 1968, Proceedings of a Panel, Vienna 6–10 May, 1968, pages 23 et seq. However, it is necessary to heat the organic fluid according to this method. In addition, those parts of the equipment used to practice the above method which are mounted above the organic fluid and are used for adding the solution to be dropped in, must be cooled in order to prevent blocking thereof. Both measures increase the equipment expense required to carry out the above method.

According to another known method for making uranium, thorium, or plutonium oxide or carbide particles, a sol comprising this oxide is dropwise added to 2-ethylhexanol having a specific water content. Oak Ridge National Laboratory, ORNL-4429 (1967/1968), pages 22 et seq. The particles are formed by gelling. Since this gelling process takes a relatively great amount of time, the dropped in sol and the 2-ethylhexanol are guided countercurrent to each other. This method requires constant supervision and adjustment of the water content of the 2-ethylhexanol, since the predetermined relationship between water and ethylhexanol must be maintained. In addition, it is very expensive to make the sol.

It is further known to add drops of a metallic salt solution or a sol emanating from a metallic salt to an aqueous ammoniacal solution. This forms gelatinous spheres by means of precipitation reactions. Energia Nucleare, 17 (1970) pages 217–224; Kerntechnik, 12. Jahrgang, (1970) pages 159–164. According to this method, it is necessary, in order to maintain the desired spherical shape, to add a considerable amount of viscosity raising medium, for example, methylcellulose or polyvinylalcohol to the solutions of the metallic chloride or nitrate being used or to the sol of these nitrates or chlorides. This method is uneconomical because the organic materials must be removed before the sintering process which is necessary in order to be able to use the particles. In order to prevent the drops from deforming when they encounter the surface of aqueous ammoniacal solution being used, it is essential that these drops pass through a predetermined length in an ammoniacal atmosphere. This results in a relatively great consumption of ammonia and requires that special devices be provided to carry away ammonia vapor. In addition, plugging up the nozzles, used for the solution or sol which is to be dropped in by the action of ammonia, must be prevented.

A further method is known according to which the spherical particles are formed from drops of the solutions or sols of the reactor fuels by means of an ammonia containing organic solvent. Euratom Symposium on Fuel Cycles for High Temperature Gas-cooled Reactors, Brussels, Belgium, June 10–11, 1965: Preparation of Uranium Dioxide and Carbide Particles by Sol-Gel-Methods. This method is particularly disadvantageous for the reason that the desired reactions run very slowly.

Finally, a method of making spherical metallic or oxide or carbide particles is also known, according to which an "aquasol" or "hydrosol" of the metallic oxide or an aqueous solution of the metallic salt is fed dropwise into a tank or bath which contains an organic solvent. Further, according to this method, in the event that it is desired to make the carbides, colloidal carbon is added to the sol or aqueous solution and the thereby formed, carbon containing, oxide particles are sintered, German Auslegeschrift No. 1,812,326. In this connection, a water saturated solvent is introduced, in which instance the solvent is arranged in a layer above an aqueous ammonia layer. To date, only hexanol and butanol have been used as solvents. However, they have a high viscosity, which is a drawback because the rate of descent of the drops is very low. This results in difficulties when the drops pass through the phase boundary of the two fluid layers provided one above the other. In addition, butanol has a considerable dissolving power for water. A further proposal known to the state of the art to use hydrocarbons, is unsuitable, because hydrocarbons have a very distinct water-repellent characteristic.

According to an unpatented proposal, it is suggested that spherical metallic oxide or carbide particles of fuel or breeder materials for nuclear reactors, such as uranium, plutonium, and thorium oxides or carbides, by made by dropwise adding a sol or an aqueous solution of metallic nitrate or chloride to a ketone or ketone mixture phase which is located above an aqueous ammonia solution. The molarity of the metallic ions is between 0.4 and 1.5. If carbides are to be formed according to this method, colloidal carbon is added to the aqueous solution or the sol. The oxide particles which are formed, if necessary containing carbon, are sintered. With this method, a ketone or ketone mixture is used that at room temperature has a dissolving power for water of up to about 4% by weight and which has a viscosity between one-half and twice that of water.

It is an object of the present invention to provide a method for making metallic oxide or carbide particles, which method, especially with the use of uranyl nitrate or chloride, will guarantee the production of dense particles having such a density that a high yield and thereby a high economy will be assured.

With this and other objects in view, the method according to the present invention, is characterized primarily in that about 1 to 3 moles of an ammonium salt, such as ammonium nitrate or chloride, as well as about 2 to 6 moles of urea are added to the aqueous solution for every mole of metallic ion contained in the solution. It is especially advantageous to add 4 moles of urea per mol of uranium to the aqueous solution. Pursuant to the preferred variation of the method according to the present invention, ammonia is added to the aqueous solution in such a quantity that after stirring, the precipitation is dissolved. In this way, the amount of time for congealing droplets (column) used to carry out the method may be decreased, or, the same columns may be made shorter. These alternatives are only possible with the use of the above described additional measure of adding ammonia.

The method according to the present invention is also advantageously practiced by adding salts, such as chlorides or nitrates or plutonium, aluminum, and/or zirconium, to the aqueous solution in such an amount that plutonium, aluminum, and/or zirconium oxidic or carbide compounds form up to 20% by weight of the metallic oxide or carbide particles. Thus, with regard to the particles produced in accordance therewith, this method permits a very extensive accommodation to the respective requirements.

It is especially advantageous pursuant to the method according to the present invention, to use a 0.8 to 1.6 mole concentration of uranium in the aqueous solution because the thus obtained particles have an especially high density. The diameter of the particles formed according to the present invention, is between 0.01 and 1.5 mm.

In the event that spherical particles are desired, this shape can be attained with a high degree of accuracy.

EXAMPLE 1

1.3 moles uranyl nitrate, 2.0 moles ammonium nitrate, and 4.0 moles urea are dissolved in water. While constantly stirring, concentrated ammonia solution is added to the above solution until a pH of 3.0 is obtained. The volume of the solution is then adjusted to 1 liter.

The solution is subsequently added dropwise to a two-phase congealing column at the rate of 400 ml/hr. The drops are formed by passing the solution through a nozzle having an inner diameter of 0.5 mm and dispersing the solution stream into drops by simultaneously vibrating the nozzle. This column comprises two layers. The top layer is a 30 cm methyl-isobutylketone organic phase. The bottom layer is a 50 cm aqueous ammonia solution. The uniform gel spheres formed in the congealing column are collected in ammonia water in a round-bottom flask beneath the column.

After the solution has been completely treated, the particles are washed with a 1% ammonia water solution, are dried in an air stream warmed to 80° C., and are heated slowly in a sintering furnace up to 600° C. From this temperature on, hydrogen is passed over the particles and the temperature is further increased up to 1300° C. to sinter the particles. The sintered particles have up to 600 $\mu$m diameter and are at 95% of the theoretical density.

EXAMPLE II 1.2 moles uranic nitrate, 2.4 moles, ammonium nitrate, 4.0 moles urea, and 0.2 moles aluminum nitrate are dissolved in water and preneutralized at a pH value of 3.0 by adding ammonia. The volume of the solution is then adjusted to 1 liter. The particles are produced from the solution in the same manner and with the same results as in Example 1.

The invention pertains to a method for production of metal oxide particles or metal carbide particles of uranium which should find utilization expecially during production of fuel and/or breeding material particles for fuel elements or breeding elements for nuclear reactors. The method of the present invention proceeds on the basis of a watery solution of uranyl nitrate or uranyl chloride which suitably can contain carbon material in colloidal form. This watery solution is introduced in droplet form into an organic phase formed by way of a ketone or ketone mixture and located above a watery ammonia phase. The invention consists therein to add as to the watery solution a predetermined quantity of an ammonium salt such as ammonium nitrate as well as to add a predetermined quantity of urea material. The particles formed after penetration of the ketone phase and after penetration of the ammonia phase standing below the ketone phase are sintered.

As to the ketone used with this method, the following comments can be provided: only such ketones or ketone mixtures are usable as the organic phase which at room temperature provide a solubility for water up to approximately 4% by weight and which have a viscosity which lies between half and double the viscosity of water at room temperature. These necessary criteria for the selection of suitable ketone materials providing basis for the present disclosure should accordingly be considered. A ketone which suffices with respect to these requirements is, for instance, methyl-isobutyl-ketone, which is set forth in the sample embodiment I.

The method of the present invention differs by far with respect to the method described by U.S. Pat. No. 2,463,842—Flack et al dated Aug. 26, 1969. The method described in the cited U.S. patent concerns, in any event, the production of metal oxide particles or metal carbide particles. With this method, however, the salt solutions are reacted or worked together with medium or compound given off during heating of ammonia. By way of introduction of droplets of salt solution into hot organic solution means accordingly ammonia becomes made available for precipitation of uranium by way of thermal decomposition of the medium or compound giving off the ammonia (compare U.S. patent cited in column 4, example embodiments 1-4 with which the salt solution is added in droplets therein under utilization of hexamethylene tetramine as a means splitting off ammonia in a hexanol phase with a temperature between 130° F. through 150° F.). Urea material also, is set forth aside from ammonium salts as a suitable material for this method as a means for splitting off or separating ammonia. Urea material forms ammonia in a similar manner as, for instance, hexamethylene tetramine during thermal decomposition.

The present invention; however, provides a teaching which is exactly opposite to the method of the reference. There may be true that with the method of the present invention, there is urea material added to the solution, though the urea material remains stable during carrying out the inventive method; ammonia is not formed during the consolidation of droplets of urea material. A decomposition of the urea material and a splitting off of ammonia during the method of the present invention would even be harmful. Moreover, the ammonia quantity necessary for consolidation of the droplets is added during the method according to the present invention as to the droplets out of the ammonia-containing ketone phase, respectively, out of the watery ammonia phase having droplets penetrating therethrough below the ketone layer. There is noted that in order to generate ammonia according to the invention, addition of urea material is not necessary as is the case with the method according to U.S. Pat. No. 3,463,842—Flack et al. The addition of urea material is based more upon the recognition that, when a predetermined quantity of ammonium salt exists in a uranium salt solution, in the presence of urea material there is formed a deposition or separation which influences in an especially advantageous manner the production of the desired gel-typed spherical-formed particles of uranyl salt solutions. With the method known from U.S. Pat. No. 3,463,842—Flack et al the concern is not particularly with the presence of ammonium ions in the salt solution before the dropping or dropleting of the solution, in contrast to the belief which might exist. The materials added to the solution such as ammonium salts and urea material serve for formation of ammonia during heating of the solution. A matching or formulation accordingly between the quantities of ammonium salt and urea material added to the salt solution as is necessary according to the present invention is not at all necessary with the disclosure of U.S. Pat. No. 3,463,842—Flack et al. From the U.S. Pat. No. 3,463,842—Flack et al; accordingly, there cannot be taken any showing or suggestion to make obvious the features of the teaching of the present invention even for an average man skilled in the art. Moreover, while with the known method means are used only for splitting off ammonia, there is stressed that with the method according to the present invention by way of cooperation or working together of the complex-forming urea material and the ammonium salt concentration provided by way of effectiveness of the ammonia, there is formed a gel-type precipitate or deposition out of the ketone, respectively, ammonia phase surrounded at a time by the droplets.

The ammonia quantity added with respect to the watery solution is limited thereby that the precipitation formed by way of addition of ammonia into the watery solution is dissolved again during a stirring of the solution as a consequence of locally increased ammonia concentration.

The metallic salt solution in the Ketone phase is added in droplets at a temperature between 15° C. and 35° C. In the sample embodiments or examples set forth in the disclosure of the present invention, statements were made without comment as to the temperature, this occurred particularly because the solution, Ketone phase and ammonia phase provided room or environmental temperature and no special setting of the temperature was necessary. The reference to temperature as to the Ketone phase and ammonia phase corresponds only to a clarification of the patent protection being sought. This foregoing commentary is being provided to make a statement as to temperature involved.

Carbon in colloidal form is added to the solution when production of metal-carbide particles is desired in place of metal-oxide particles. Utilization of carbon for this purpose has long been known to the average man skilled in the art in this field of endeavor. This method is described for example, in the German disclosure No. 1,812,326, which is referred to earlier in this U.S. description. Reference to addition of colloidal carbon to the solution can be found also in the U.S. Pat. No. 3,463,842—Flack et al. In column 2, lines 36 and 37, there is described that the solution can contain colloidal carbon. Claim 1 of this patent disclosure also refers to the possibility of addition of carbon.

Clarification can be provided with respect to the suitable ketone phases. Suitable for the inventive method are such ketones of which water solubility amounts to no more than 4% by weight and for which a viscosity is provided lying between $\frac{1}{2}$ and twice the viscosity of water. Such ketones have proven themselves especially in view of the boundary-surface tension against water which is meaningful for the passage of the droplets through the phase boundary between the ketone phase and the ammonia phase, as well as, in view of the capacity for taking up ammonia and chemical resistance against water and ammonia, all being factors making such ketones suitable at an optimum for carrying out the inventive method.

Also, clarification includes the two-phase system upon which the present invention is based. In addition thereto, the inventive method is carried out at room temperature.

Concerning the method temperature no statements were made originally since no special setting of the temperature is necessary for carrying out the method.

U.S. Pat. No. 3,888,787—Hein et al. belonging to the assignee of the present invention, represents the method upon which the present disclosure proceeds to provide improvement. There must be noted; however, that the components of the aqueous metal-salt solution used with the present method differ basically from the components of the metal-salt solution disclosed by U.S. Pat. No. 3,812,049—Noothout, et al, dated May 21, 1974. The metal-salt solution of U.S. Pat. No. 3,812,049—Noothout, particularly, contains substances which release ammonia during heating (so-called precipitating medium) so that solidified particles form when the solution is heated (Compare column 5, lines 36–40 of U.S. Pat. No. 3,812,049—Noothout). The heating of the solution occurs in a manner that one disperses the solution in a hot, organic phase (compare sample embodiments 2, 3, and 4 of U.S. Pat. No. 3,812,049). The solutions disclosed by U.S. Pat. No. 3,812,049 however, are also not stable at low temperature so that it is necessary to add a stabilizer for delaying the precipitating reactions.

When the method disclosed by U.S. Pat. No. 3,887,787—Hein et al. dated June 10, 1975, the aqueous metal-salt solutions are dropped into a pouring column in which a liquid ketone phase is provided above the aqueous ammonia phase and with which the ammonia necessary for the precipitating reaction diffuses into the droplets from the outside. Accordingly, there is not necessary to add precipitating medium to the solution or connected with such precipitating means to add stabilizers which are to preclude a premature precipitation prior to the dropping of the solution in droplets. The sample embodiment 2 of U.S. Pat. No. 3,887,787—Hein et al. sets forth in addition of ammonia water which does not effect any precipitating of the solution, but rather which is only provided for pre-neutralization as taken into consideration as follows: Ammonia is added only in such a quantity "that after stirring, the precipitation is dissolved". Contrary to the belief which may exist, there is not necessary consequently any addition to stabilizers to the solution as disclosed by U.S. Pat. No. 3,812,049—Noothout or by U.S. Pat. No. 3,629,138—Thomas dated Dec. 21, 1971. There is not disputed that with addition of ammonia to uranyl nitrate or uranyl chloride that the corresponding ammonium salt is formed as established by citation of U.S. Pat. No. 3,453,216—Fitch, et al. dated July 1, 1969. The recognition thereof alone does not lead the expert at all to the adding of ammonium chloride to the solution disclosed by U.S. Pat. No. 3,887,787, particularly since these materials are not suitable as precipitating means as is known to every expert or average man skilled in the art. The urea material however, is also not a precipitating means as added in limits between 2-6 moles according to the present invention. The urea material remains stable at room temperature to which the solution according to the present invention is dropped in droplets.

In order to aid in understanding of the procedure of the present inventive method, the following additional comments are set forth:

As a consequence of the high $NH_4+$ concentration which results in the solution in accordance with the inventive features, there forms a buffer system ($NH_4+/NH_3$) with the $NH_3$ necessary for precipitating the Uranylions so that the precipitating reaction occurs at a pH-value which is lower than the pH value normally to be expected for the precipitating reaction. The formed buffer system maintains constant pH value additionally during the course of the reaction so that the precipitating conditions are controllable very well in an advantageous manner. This is decisive therefore, that particles produced according to the inventive method provide high density and that high output with uniform quality of the particles can be attained which previously was not attainable during production of nuclear fuel particles.

The present invention involves a specific combination of method steps believed to be not shown or suggested by any attempt to pyramid three references including Hein et al., Noothout et al. and Fitch. The present invention refers to a method belonging to the assignee of the present disclosure of U.S. Pat. No. 3,887,787—Hein et al., correctly cited as reference.

According to the method of U.S. Pat. No. 3,888,787—Hein et al. for production of metal oxide particles or metal carbide particles, aside from aqueous solutions of metal nitrate or metal chloride, also sols of these salts are capable of being in droplets (compare U.S. Pat. No. 3,888,787, column 1, lines 12-14, especially line 14). The invention, however, proceeds only on the basis of one method variation possible according to U.S. Pat. No. 3,888,787:

The present inventive method is limited to dropletting aqueous uranylnitrate solutions or uranylchloride solutions. The foregoing is meaningful since for every expert there is accordingly clarified to begin with that the invention proceeds on the basis of a solution in which metal nitrate or metal chloride are soluble for an unlimited time. The solution is stable and requires no stabilizers for stabilization.

Every expert knows that the foregoing pure solutions need no stabilizers to be added thereto, since these solutions are molecular or ion dispersed. This is confirmed by the disclosure of U.S. Pat. Nos. 3,463,216—Fitch et al. and 3,629,138—Thomas. Both references concern working of aqueous brines (compare column 1, lines 12-16 of U.S. Pat. No. 3,453,216 and column 1, lines 12-19 of U.S. Pat. No. 3,629,138). The invention; however, does not concern the composition of a sol but rather proceeds much more on the basis of a pure solution. Consequently, in evaluating the state of the art, the crux of the teaching of the present invention should not be disregarded.

The aqueous solution is in droplets at room temperature whereby the solution to be conveyed in droplets as well as the two-phase bath are adjusted to a temperature between 15° and 35° C.

This feature of the present inventive method makes clear immediately the essential difference between the method described by the U.S. Pat. Nos. 3,888,787 and 3,812,049. With the method of U.S. Pat. No. 3,812,049, the solution to be conveyed in droplets contains a material which during dropletting of the solution splits or separates ammonia in a heated bath and in this manner effects a solidification or pre-solidification of the drops. With the method of U.S. Pat. No. 3,888,787 in contrast, ammonia diffuses from the two-phase bath in the drops of the solution so that the solidification of the drops is attainable at room temperature. These differences between the methods of U.S. Pat. Nos. 3,888,787 and 3,812,049 simultaneously hinder the expert to apply measures useful according to the method of U.S. Pat. No. 3,812,049 in a self-understood manner, also with the method of U.S. Pat. No. 3,888,787. Such a transfer of measures contrary to the belief which may exist is even less obvious for the expert as is recognizable therein that the components added to the solution of U.S. Pat. No. 3,812,049 are to create a stable condition of the solution; such stability with the solution involved with the present invention exists already without any addition of such components. Attention has been directed thereto that the addition of urea material to the solution of U.S. Pat. No. 3,812,049 is necessary in order to prevent premature precipitation in the solution containing Hexamethylentetramin. Apparently this point may have been disregarded and moreover, the same will be considered once again subsequently herein.

Ammonia is added to the solution in such a quantity that the pH value to be set depends in essence upon the uranylion-concentration in the solution whereby with high concentrations pH values are set around 2 and at low concentrations pH values are set around 3. Characteristic moreover is that after addition of ammonia, every precipitation dissolves again by stirring.

There must be kept in mind under these circumstances that pure solutions involved with the present invention need no stabilizers. Every expert knows that not only uranylnitrate solutions but rather also other heavy metal salt solutions react by hydrolysis and that pH value of the solutions rises upon addition of ammonia without at first having any remaining precipitation arise. There does not exist contrary thereto that hereby during addition of ammonia, precipitations arise by pH values locally too high in the solutions, though precipitations dissolves for example, by stirring the solution up again very quickly so far as collectively a pH value characteristic for precipitations is not exceeded in this solution. With the inventive method, this pH value lies approximately in a range between 2 and 3 according to the uranylion-concentration. Under this condition, the solution to be conveyed in droplets remains stable to an unlimited time and requires no stabilizer in contrast to sols which are unstable from a thermodynamic standpoint and which requires stabilizers.

Attention can be directed to the fact that with an aqueous solution as described by the U.S. Pat. No. 3,812,049, urea material is inserted or used as a stabilizer. This factual situation is not disputed. There must be noted that the urea material is not used with the U.S.

Pat. No. 3,812,049, in order to prevent or hinder precipitation reactions by addition of ammonia. With the method described by the U.S. Pat. No. 3,812,049, a medium, namely Hexamethyentehamine is added to split or separate ammonia and this medium is added to the solution to be conveyed in droplets in contrast to the teaching of the present invention. Consequently, care must be taken by corresponding method steps that an undesired premature decomposition of this medium does not occur. With the U.S. Pat. No. 3,812,049, such is precluded on the one hand by subcooling of the solution and by the U.S. Pat. No. 2,453,216, column 3, lines 60 etc. on the other hand is attained by addition of urea material. Sub-cooling or under cooling and urea material prevent or hinder an undesired premature precipitation of the solution (U.S. Pat. No. 3,812,049, column 2, lines 43 etc.).

This factual situation cannot cause any expert to add urea material to the solution known from the U.S. Pat. No. 3,888,787 (which erroneously is preconditioned, however, during evaluation of the present invention). The aqueous solution upon which the present invention proceeds is stable and also remains a stable solution after addition of ammonia so long as the added ammonia quantity is so limited or restricted that locally forming ammonium-diuranate dissolves again after a short time by stirring. Uranyl-salt solutions are stable without limit and no stabilizer is needed therewith. Consequently, the different composition of the solutions compared with each other cannot be disregarded at all but the concern with the present invention particularly is to evaluate correctly and in a justifiable manner the state of the art and such proper evaluation is essential for recognizing the teaching of the present invention. The U.S. Patents considered as references cannot preclude granting of patent protection for the features of the present invention.

According to the present invention there has been proven in any event that only in the presence of ammonium nitrate+urea or uranyl nitrate or uranyl chloride, urea, ammonium salt in the aqueous or watery solution would there arise dense and spherically formed particles whereas no inventively essential meaning can be attributed thereto as to basis for the effect attained with this measure. Preferred ammonium salts are ammonium nitrate or ammonium chloride. Ammonium salts with ammonia form a buffer system, and by way of different selection of precipitation conditions, the precipitation product is influenced decisively. Recognition of patentability of the features of the present invention cannot be influenced; however, by this factual situation.

It is, of course, to be understood that the present invention is by no means limited to the specific examples set forth above but also comprises any modifications within the scope of the appended claims.

What is claimed is:

1. A method of making uranium oxide particles for material for nuclear reactors, which includes in combination the steps of: to an aqueous solution of a uranium salt selected from the group consisting of uranyl nitrate and uranyl chloride, adding for every mole of uranium contained in the solution, 1 to 3 moles of an ammonium salt, 2 to 6 moles of urea, passing said solution by drops through a column working at room temperature, said column containing a ketone phase floating above aqueous ammonia solution, said ketone phase having a solubility for water not greater than approximately 4% by weight and a viscosity between one-half and twice the viscosity of water, passing said aqueous uranium salt solution by drops in order to form gel-like uranium oxide particles, and subsequently washing, drying and sintering said particles thus formed.

2. A method according to claim 1, in which said ammonium salt selected from the group consisting of ammonium nitrate and ammonium chloride.

3. A method according to claim 1, in which 4 moles of urea per mole of uranium are added to said aqueous solution.

4. A method according to claim 1, in which includes the step of adding ammonia to said aqueous solution in such a quantity that after stirring the precipitation is dissolved.

5. A method of making particles according to claim 1, which includes the steps of adding, to said aqueous solution, at least one salt of an element selected from the group consisting of plutonium, aluminum, and zirconium in such an amount that compounds of said elements, derived from said salts, are present up to 20% by weight in said particles.

6. A method according to claim 5, in which said salts are chlorides and nitrates.

7. A method according to claim 1, in which uranium is present in said aqueous solution in a concentration of 0.8 to 1.6 moles/l.

8. In a method as claimed in claim 1, in which colloidal carbon is added to said aqueous uranium salt solution.

9. In a method as claimed in claim 1, in which the ketone phase is a methylisobutylketone organic phase.

* * * * *